Aug. 7, 1923.
R. H. SMITH
1,463,851
METHOD OF BRICKING ICE CREAM
Filed July 8, 1921
3 Sheets-Sheet 1
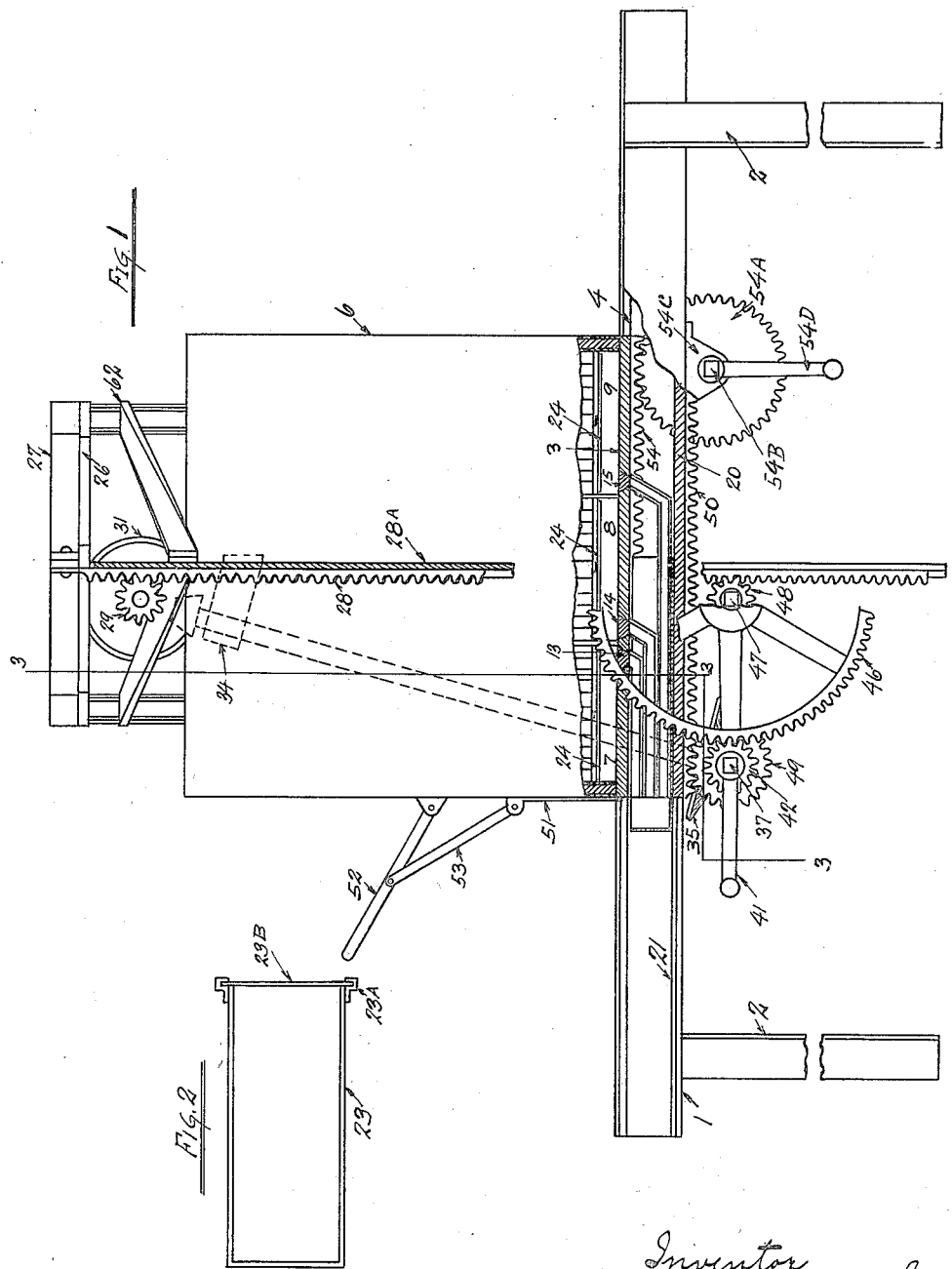
Inventor
Ross H. Smith
By W. L. Lord
Attorney Aug. 7, 1923.
R. H. SMITH
1,463,851
METHOD OF BRICKING ICE CREAM
Filed July 8, 1921
3 Sheets-Sheet 2
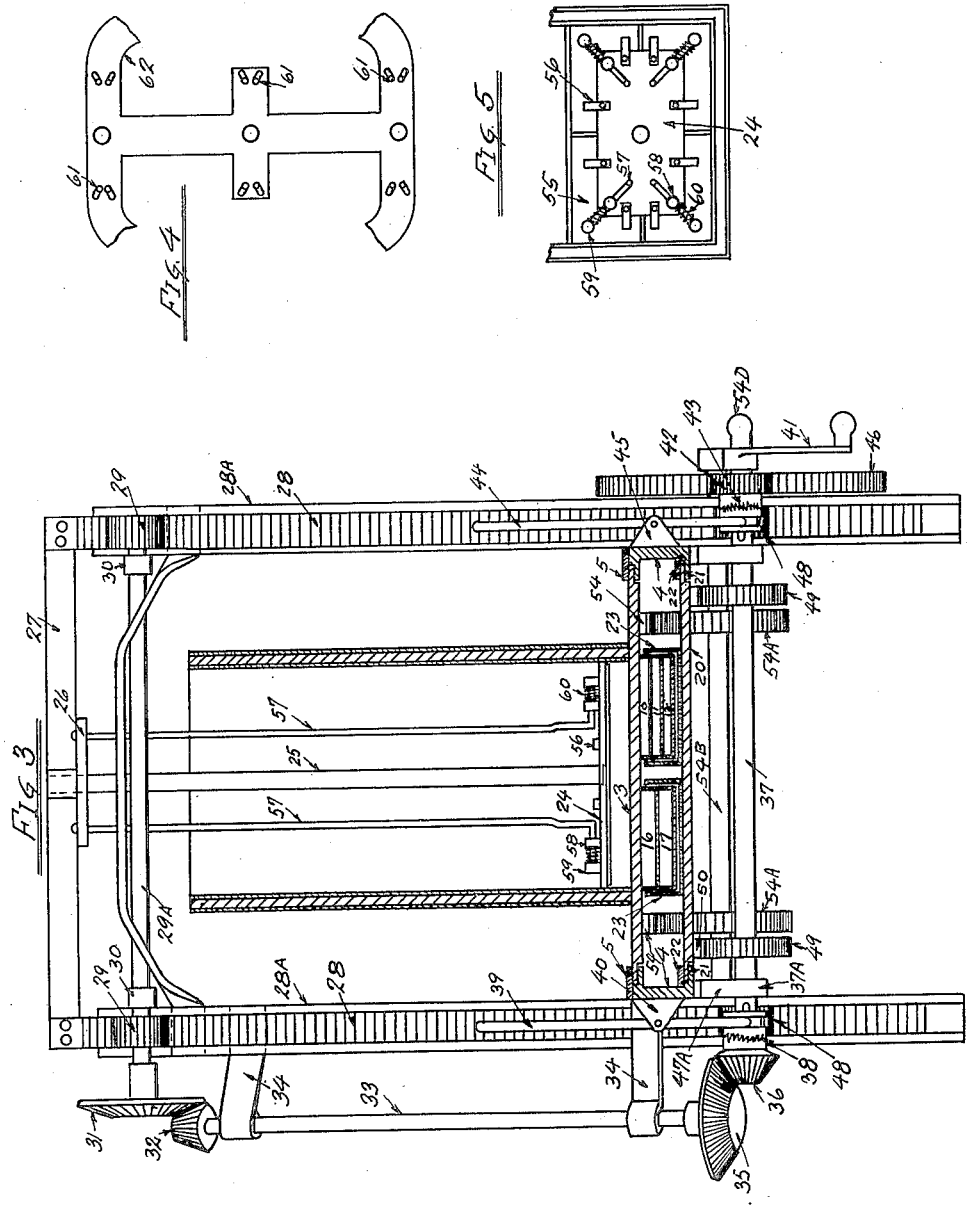

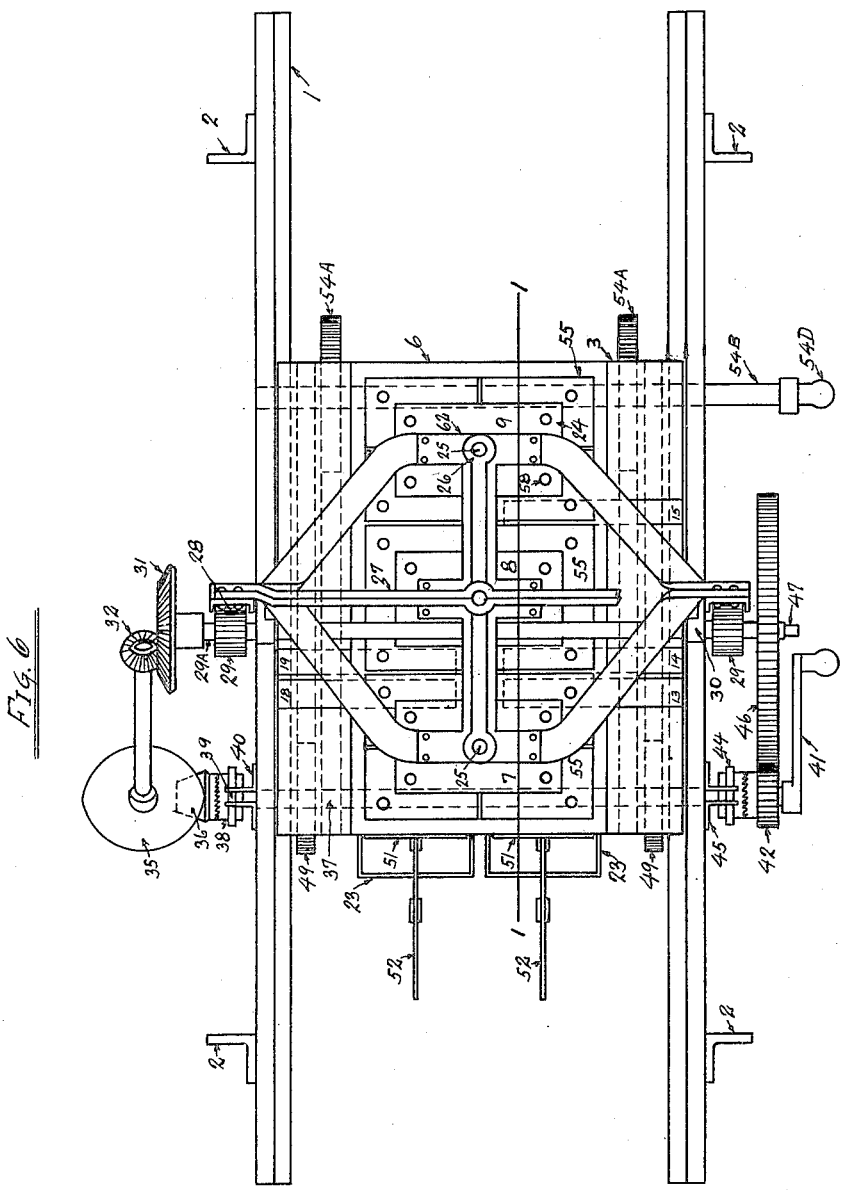

Patented Aug. 7, 1923.

1,463,851

UNITED STATES PATENT OFFICE.

ROSS H. SMITH, OF ERIE, PENNSYLVANIA.

METHOD OF BRICKING ICE CREAM.

Original application filed January 5, 1920, Serial No. 349,446. Divided and this application filed July 8, 1921. Serial No. 483,137.

*To all whom it may concern:*

Be it known that I, Ross H. SMITH, a citizen of the United States, residing at Erie, in the county of Erie and State of Pennsylvania, have invented new and useful Improvements in the Methods of Bricking Ice Cream, of which the following is a specification.

In making ice cream bricks it is desirable to form the bricks with the cream in a soft plastic state and with as little pressure as possible so that the cream will have as little density as possible. This is desirable for two reasons. First it makes it more palatable and at the same time increases the overrunning. In forming bricks, therefore, the practice is to shape the bricks in this soft plastic form with as little pressure as possible and then complete the freezing while the brick is held in this shape. This has been more readily accomplished where the brick was formed of one kind of cream. Where, however, the cream has been formed in several layers the usual practice has been to form a layer of the soft plastic cream, freeze it, and then apply another layer. Some attempts have been made to form the layers simultaneously but such methods have not gone into general practice. The purpose of this invention is to form bricks quickly and with little compression, and in carrying it out I form the brick in the soft plastic form, either of one layer of material, or of several layers of varying materials, in one operation and then freeze it in the usual manner.

The mechanism for carrying out this method is included in an application of which this is a division, filed Jan. 5th, 1920, No. 349,446 and is illustrated in the accompanying drawings as follows:—

Fig. 1 shows a side elevation, partly in section, on the line 1—1 in Fig. 6.

Fig. 2 a plan view of the mold case.

Fig. 3 a section on the line 3—3 in Fig. 1.

Fig. 4 a plan view of a plunger sealing plate guide.

Fig. 5 is a section on the line 5—5 in Fig. 3.

Fig. 6 a plan view of the machine.

1 marks the table or frame of the machine and 2 legs supporting the frame.

A sliding receptacle platform 3 is mounted in guides 4 on the sides of the frame and is held in place by the plates 5. A receptacle 6 is mounted on the platform 3 and as shown has three compartments 7, 8 and 9. Nozzles 10, 11 and 12 extend from one side of these compartments and gates 13, 14 and 15 control the inlets to these nozzles so that they may be connected with the receptacles or closed as desired. At the opposite sides of the receptacles 7 and 8 nozzles 16 and 17 are provided and these have the gates 18 and 19, the arrangement as will be readily apparent providing for forming bricks of two layers, or bricks of three layers, as may be desired. A sliding mold platform 20 is mounted in the guides 21 in the side frame. Plates 22 are arranged over the edges of the platform and hold it in place on the guide. Mold cases 23 are placed on the platform 20. They have one end open and guides 23$^a$ are arranged at this open end into which gates 23$^b$ may be placed.

The mold cases are of a size to slip over the combined nozzles of either the three layer or two layer side and make a sliding fit with these nozzles at the sides and bottom when in place and extend up the sides of the nozzles a sufficient distance to receive the soft plastic material from the nozzles. In making the cream according to my method the mold platform with the molds is moved to the right so that the closed ends of the molds are adjacent to the ends of the nozzles and as the soft plastic material is discharged from the nozzles the end of the case is moved away from the end of the nozzle, the movement being so proportioned that the movement of the case corresponds with the moving mass as it is discharged so that the soft plastic material is confined with a cross sectional shape corresponding to its shape when discharged and the layers of the material are formed in contact. In this way it is possible to form the brick of the soft plastic material and still keep the layers well-defined and the material is placed in the mold with so little pressure as to maintain its open or porous texture.

The compartments are provided with plungers 24. These plungers are carried by stems 25 which are mounted in a cross plate 26 and the cross plate is carried by a cross head 27. The cross heads are mounted on racks 28 and the racks operate in the guides 28$^A$ extending upwardly from the frame. Pinions 29 mesh the racks 28. The pinions are carried by a shaft 29$^A$, the shaft being mounted in bearings 30 on the guides 28$^A$ A bevelled gear 31 is fixed on the shaft 29^A and meshes a pinion 32. The pinion 32 is fixed on a shaft 33 and the shaft 33 is mounted in bearings 34 extending from one of the guides 28^A. A bevelled gear 35 is fixed on the shaft 33 and meshes a pinion 36 journaled on a shaft 37. The shaft 37 is mounted in bearings 37^A carried by the frame 1. The pinion 36 may be locked or released from the shaft 37 by means of a clutch 38, the clutch being thrown by a lever 39 mounted in a bracket 40 extending from the side frame. A crank 41 is fixed on the end of the shaft 37. By means of this crank the shaft 37 may be turned and with it the plungers moved. This connection is designed to move the plungers of compartments 7, 8 and 9 at a speed which will deliver the plastic material from the nozzles 10, 11 and 12.

A pinion 42 is journaled on the shaft 37 and may be locked or released from the shaft 37 by a clutch 43. The clutch is thrown by a lever 44 mounted on a bracket 45 extending from the frame. The pinion 42 meshes a gear 46. The gear 46 is carried by a shaft 47 carried by bearings on the frame 47^A. Gears 48 are fixed on the shaft 47 and mesh the racks 28. The timing of this connection with the racks is such as to move the plungers of compartments 7 and 8 at a speed which will deliver the mass from the nozzles 16 and 17 in conformity to the movement of the mold. Where but two plungers are used it is obvious that they must be moved a little faster than where the three plungers are delivering to the mold.

Gears 49 are fixed on the shaft 37 and mesh racks 50 on the under-side of the mold platform 20. These gears are so proportioned with relation to the driving connections through the racks 28 as to move the mold cases mounted on the platform 20 at a speed which will correspond to the discharge of the mass from the nozzles. Obviously in proportioning these cases and these connections the cross sections of the receptacles relatively to the cross section of the brick must be considered and the speed of the molds be enough faster than the plunger to compensate for the difference in cross section assuming that the receptacles are of larger cross section than the bricks as shown. When the open end of the mold case reaches a position opposite the end of the nozzle a gate 51 is moved down across the end of the nozzles. These gates are operated by levers 52 connected with the gate by links 53. The gates 23^A are also placed in the molds. The gate 51, however, prevents the movement of the material from the ends of the nozzles while one mold case is being removed and another one inserted.

In order to fill the receptacles the plungers are lifted to a position above the receptacles and the receptacles are moved from under the plunger to a position in which they may be readily filled. This is accomplished by moving the receptacle support or frame 3. Racks 54 are arranged on the under-side of the supports and these mesh the gears 54^A. The gears 54^A are carried by a shaft 54^B mounted in bearings 54^C in the frame. A crank 54^D is provided for operating the shaft 54^B.

In order that the plunger may make a comparatively tight fit with the walls of the receptacle I prefer to provide spring-actuated plates 55 for making a closer fit with said walls. These plates 55 are mounted on the tops of the plungers and preferably are made in four parts. They are slidingly secured by means of the arms 56 which are secured to the top of the plungers and extend over the plates 55. Rods 57 extend from the posts 59 at the corners of the plates 55 through the posts 58 on the plungers 24 and springs 60 are mounted on the rods 57 between the posts 59 and 58 and crowd the plates 55 into contact with the walls of the receptacle. The rods 57 are bent upwardly and extend to the cross plates 26 to which they are secured. They extend through openings 61 in the guide plates 62, these guide plates being secured to the guides 28^A. The rods have the cam surface or bends so that when the rods are drawn up with the plungers to a position which brings the bends into engagement with the walls of the opening 61 they are forced inwardly thus retracting the plates 55 slightly from the side walls of the receptacle. The purpose of this is to assure the ready re-entry of the plungers into the receptacles after the plungers have been withdrawn to permit the refilling of the receptacles and it is desired to return the plungers to the receptacles.

It will be noted that the crank 41 may be transferred to the shaft 47 which is provided with a squared end so that the plunger may be readily returned.

After the soft plastic material has been run into the molds it is frozen in this form.

What I claim as new is:—

1. The method of bricking ice cream which consists in taking the mass in a soft plastic state; squirting it from the mass with a cross sectional form of the finished brick; confining the mass as it is discharged to the shape discharged; and severing the brick from the mass.

2. The method of bricking ice cream which consists in taking the mass in a soft plastic state; squirting it from the mass with a cross sectional form of the finished brick; and depositing same in a receptacle having the shape of the mass at substantially atmospheric pressure; and severing the brick from the mass.

3. The method of bricking ice cream which consists in taking the mass in a soft plastic state; squirting it from the mass with a cross sectional form of the finished brick; confining the mass as it is discharged to the shape discharged; severing the brick from the mass; and freezing the brick to a point that it will hold its shape.

4. The method of bricking ice cream which consists in taking the mass in a soft plastic state; squirting a plurality of layers from the mass with the layers in contact from the point of discharge; confining the material as it is discharged; and severing the brick from the mass.

5. The method of bricking ice cream which consists in taking the mass in a soft plastic state; squirting a plurality of layers from the mass with the layers in contact from the point of discharge with a combined cross sectional area of the finished brick; confining the mass as it is discharged to the shape discharged; and severing the brick from the mass.

6. The method of bricking ice cream which consists in taking the mass in a soft plastic state; squirting a plurality of layers from the mass with the layers in contact from the point of discharge with a combined cross sectional area of the finished brick; and depositing same in a receptacle having the shape of the mass at substantially atmospheric pressure; and severing the brick from the mass.

7. The method of bricking ice cream which consists in taking the mass in a soft plastic state; squirting a plurality of layers from the mass with the layers in contact from the point of discharge with a combined cross sectional area of the finished brick; confining the mass as it is discharged to the shape discharged; severing the brick from the mass; and freezing the brick to a point that it will hold its shape.

In testimony whereof I have hereunto set my hand.

ROSS H. SMITH.